US009400497B2

(12) United States Patent
Tsuda et al.

(10) Patent No.: US 9,400,497 B2
(45) Date of Patent: Jul. 26, 2016

(54) NUMERICAL CONTROL DEVICE

(71) Applicant: Mitsubishi Electric Corporation, Chiyoda-ku, Tokyo (JP)

(72) Inventors: Takeshi Tsuda, Tokyo (JP); Tomonori Sato, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 404 days.

(21) Appl. No.: 14/131,252

(22) PCT Filed: May 9, 2013

(86) PCT No.: PCT/JP2013/063050
§ 371 (c)(1),
(2) Date: Jan. 7, 2014

(87) PCT Pub. No.: WO2014/181424
PCT Pub. Date: Nov. 13, 2014

(65) Prior Publication Data
US 2015/0153719 A1    Jun. 4, 2015

(51) Int. Cl.
*G05B 19/19* (2006.01)
*G05B 19/4063* (2006.01)
*G01M 13/00* (2006.01)
*G01M 99/00* (2011.01)

(52) U.S. Cl.
CPC .............. *G05B 19/19* (2013.01); *G01M 13/00* (2013.01); *G01M 99/008* (2013.01); *G05B 19/4063* (2013.01); *G05B 2219/31439* (2013.01); *G05B 2219/34286* (2013.01)

(58) Field of Classification Search
None
See application file for complete search history.

(56) References Cited

U.S. PATENT DOCUMENTS 7,193,696 B2 * 3/2007 Engelbart ............. B29C 70/384
356/237.1
8,600,542 B2   12/2013 Fujishima et al.
(Continued)

FOREIGN PATENT DOCUMENTS

JP    61-026101 A    2/1986
JP    01-072604 A    5/1989
(Continued)

OTHER PUBLICATIONS

Schiltknecht, U.: "*BESCHRIFTEN—Teilemarkierung mit Prägewerkzeug in den Fertigungsprozess integriert.*" In: MM Das IndustrieMagazin, Apr. 2009, pp. 36 to 39.
(Continued)

Primary Examiner — Ryan Jarrett
(74) Attorney, Agent, or Firm — Sughrue Mion, PLLC

(57) ABSTRACT

A numerical control device that controls, in a machine tool, driving of a motor based on a machining program is provided. The numerical control device includes a position-command generating unit configured to generate a position command to the motor and a mark-command generating unit configured to generate a mark command for machining of a mark indicating that an abnormality occurs in the machining. The mark-command generating unit sequentially stores information concerning a moving route of the tool by the machining and generates, when an alarm is raised because the abnormality is detected, as the mark command, a moving command for moving the tool in a direction opposite to a direction during the machining while correcting a position of the tool in a tool axis direction with respect to a position during the machining, and the position-command generating unit generates the position command based on the mark command.

5 Claims, 8 Drawing Sheets

(56) References Cited

U.S. PATENT DOCUMENTS

| | | | | |
|---|---|---|---|---|
| 8,721,944 | B2* | 5/2014 | Luisi | A61B 5/1077 264/129 |
| 2014/0172144 | A1* | 6/2014 | Kniazev | G06T 7/001 700/110 |

FOREIGN PATENT DOCUMENTS

| JP | 01-237092 A | 9/1989 |
|---|---|---|
| JP | 05-228630 A | 9/1993 |
| JP | 06-028026 A | 2/1994 |
| JP | 08-245060 A | 9/1996 |
| JP | 2008-234278 A | 10/2008 |
| JP | 2011-036881 A | 2/2011 |
| JP | 2011-158979 A | 8/2011 |

OTHER PUBLICATIONS

Communication dated Mar. 12, 2015, issued by the German Patent Office in counterpart German application No. 11 2013 000 138.1.

* cited by examiner

```
N1 G54 G90 G1 X0. Y0. Z0. F3000
N2 X50.
N3 Y0. 1
N4 X0.
N5 Y0. 2
N6 X50.
...
N50 Y5. X0.
N51 Y5. X20.
N52 Z0. 5
N53 X30.
N54 Z0.
N55 X50.
N56 Y5. 1
N57 X30.
N58 Z5.
...
```

US 9,400,497 B2

NUMERICAL CONTROL DEVICE

CROSS REFERENCE TO RELATED APPLICATIONS

This application is a National Stage of International Application No. PCT/JP2013/063050 filed May 9, 2013, the contents of all of which are incorporated herein by reference in their entirety.

FIELD

The present invention relates to a numerical control device that subjects a machine tool to numerical control (NC) and, more particularly, to a numerical control device for making it possible to easily recognize defective work caused by occurrence of an abnormality during machining.

BACKGROUND

A numerical control device mounted on a machine tool always monitors occurrence of an abnormality in the operation and the state of the machine tool. Upon detecting occurrence of an abnormality, the numerical control device raises a warning (an alarm) with display, sound, or the like and stops driving of the machine tool. By stopping the driving of the machine tool, the numerical control device prevents malfunction of the machine tool and breakage of the machine tool or the like due to the malfunction.

The abnormality of the machine tool is caused by various factors. The factors of the abnormality are that, for example, a driving load of a motor becomes excessively large because of a lubrication failure, a cutting load becomes excessively large because of breakage of a tool, and an error between a command position and a motor detection position becomes excessively large. As the alarm, besides an alarm due to an event that could regularly occur, an alarm due to an irregular event with low reproducibility is also present such that, for example, an alarm is raised according to a state of removal of chips.

When an alarm is raised in the machine tool, after content of the alarm is checked, recovery work for eliminating a factor causing the alarm is carried out. When the recovery work is finished, the machine tool resumes machining. Usually, a user, a maintenance staff member, or the like performs the check of the content of the alarm and the recovery work.

The recovery work can be sometimes automatically carried out without human intervention. For example, Patent Literature 1 proposes a numerical control device that enables automatic recovery of a machine tool using a recovery operation program corresponding to content of an abnormality. Patent Literature 2 proposes a control method for automatically generating, when an automatic operation by an NC program command is suspended, a recovery procedure according to content of an operation executed according to the NC program command.

If automation of the recovery work is possible, it is possible to reduce time required for recovery and labor for the recovery. Even if machining of work is suspended because an alarm is raised, the machine tool can resume the following machining of the work early without human intervention.

CITATION LIST

Patent Literature

Patent Literature 1: Japanese Patent Application Laid-Open No. 2008-234278
Patent Literature 2: Japanese Patent Application Laid-Open No. 2011-158979

SUMMARY

Technical Problem

When an alarm is raised during machining that affects a final shape of work such as finishing, defective work due to scratches on a machined surface is sometimes caused. In this case, it may be better to suspend the machining and discharge the defective work rather than finishing recovery work and then immediately resuming machining after a point in time when the alarm is raised. For example, when tapping is suspended halfway, although accuracy of the tapping is often markedly deteriorated, because it is difficult to determine a machining failure from a finish shape, in the tapping, it is desirable to discharge work at the time of alarm raising as defective work.

Transfer devices for automatically discharging or collecting machined work to the outside such as a belt conveyor, a loader, a parts catcher, a shooter, and a robot hand are sometimes provided beside a machine tool. In pieces of work collected by these transfer devices, normally machined non-defective items and abnormally machined defective items are mixed. Sorting of the non-defective items and the defective items is performed by manual inspection work, vision, or measurement by a machine such as a three-dimensional measuring instrument. In the case of defective work due to scratches on a machined surface, it is more difficult to sort the defective work as the scratches are less conspicuous. For example, when an alarm is raised during finishing, there is a problem in that it is difficult to sort defective work at a glance.

To enable easy sorting of defective work, a mark for identifying that work, during machining of which an abnormality occurs, is defective work is sometimes appended to the work. Because a finish shape of work is different for each of machining programs, a command for appending the mark has to be prepared for each of the machining programs.

Further, because the shape of work changes at any time according to a progress stage of machining, the command for appending the mark has to be prepared for each of progress stages of the machining. Therefore, there is a problem in that it is necessary to prepare a complicated machining program to append the mark to the work, during machining of which an abnormality occurs.

The present invention has been devised in view of the above and it is an object of the present invention to obtain a numerical control device makes it possible to machine, with a simple machining program, a mark for identifying work, during machining of which an abnormality occurs, and easily sort defective work caused by occurrence of an abnormality.

Solution to Problem

There is provided a numerical control device according to an aspect of the present invention that controls, in a machine tool including a motor for moving a tool for machining of work, driving of the motor based on a machining program, the numerical control device including: a position-command generating unit configured to generate a position command to the motor; and a mark-command generating unit configured to generate a mark command for machining of a mark indicating that an abnormality occurs in the machining, wherein the mark-command generating unit sequentially stores information concerning a moving route of the tool by the machining and generates, when an alarm is raised because the abnormality is detected, as the mark command, a moving command for moving the tool in a direction opposite to a direction during the machining while correcting a position of the tool in a tool axis direction with respect to a position during the machining, and the position-command generating unit generates the position command based on the mark command.

Advantageous Effects of Invention

The numerical control device according to the present invention enables easy sorting of defective work by machining a mark in a position traced back on a sequentially stored moving route. The numerical control device can machine the mark irrespective of the shape of work and a progress stage of machining even if a complicated machining program is not prepared.

Consequently, there is an effect that the numerical control device makes it possible to machine, with a simple machining program, a mark for identifying work, during machining of which an abnormality occurs, and easily sort defective work caused by the occurrence of the abnormality.

DESCRIPTION OF EMBODIMENTS

Embodiments of a numerical control device according to the present invention are explained below based on the drawings. The present invention is not limited by the embodiments.

First Embodiment

Figure 1:
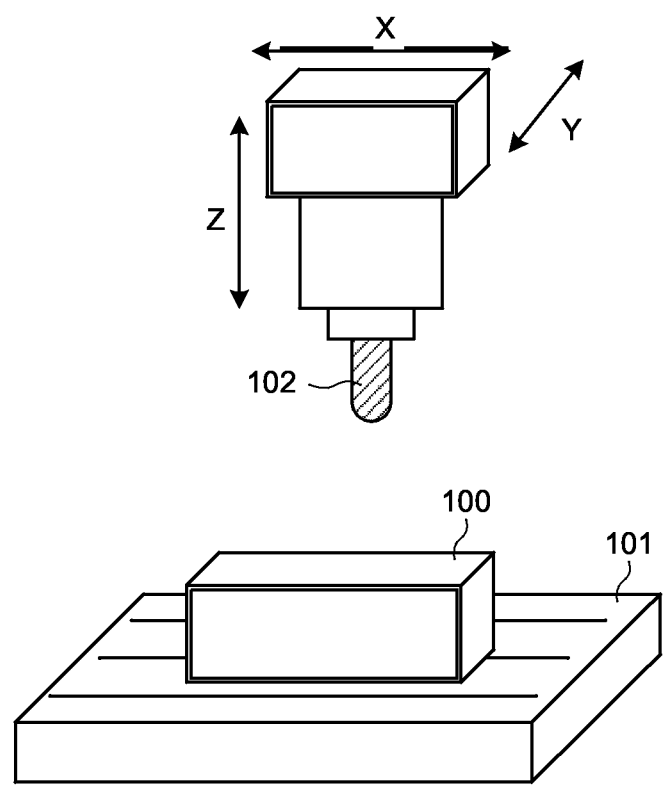
FIG. 1 is a diagram of the overall configuration of a machine tool including a numerical control device according to a first embodiment of the present invention.

FIG. 1 is a diagram of the overall configuration of a machine tool including a numerical control device according to a first embodiment of the present invention. The machine tool includes a machine tool main body and the numerical control device. The machine tool main body includes a stage 101 on which work 100 is placed and motors configured to move a tool 102 for machining of the work 100. The machine tool includes the motors for an X axis, a Y axis, and a Z axis, which are three axes of movement perpendicular to one another. The numerical control device controls driving of the motors based on a machining program.

Figure 2:
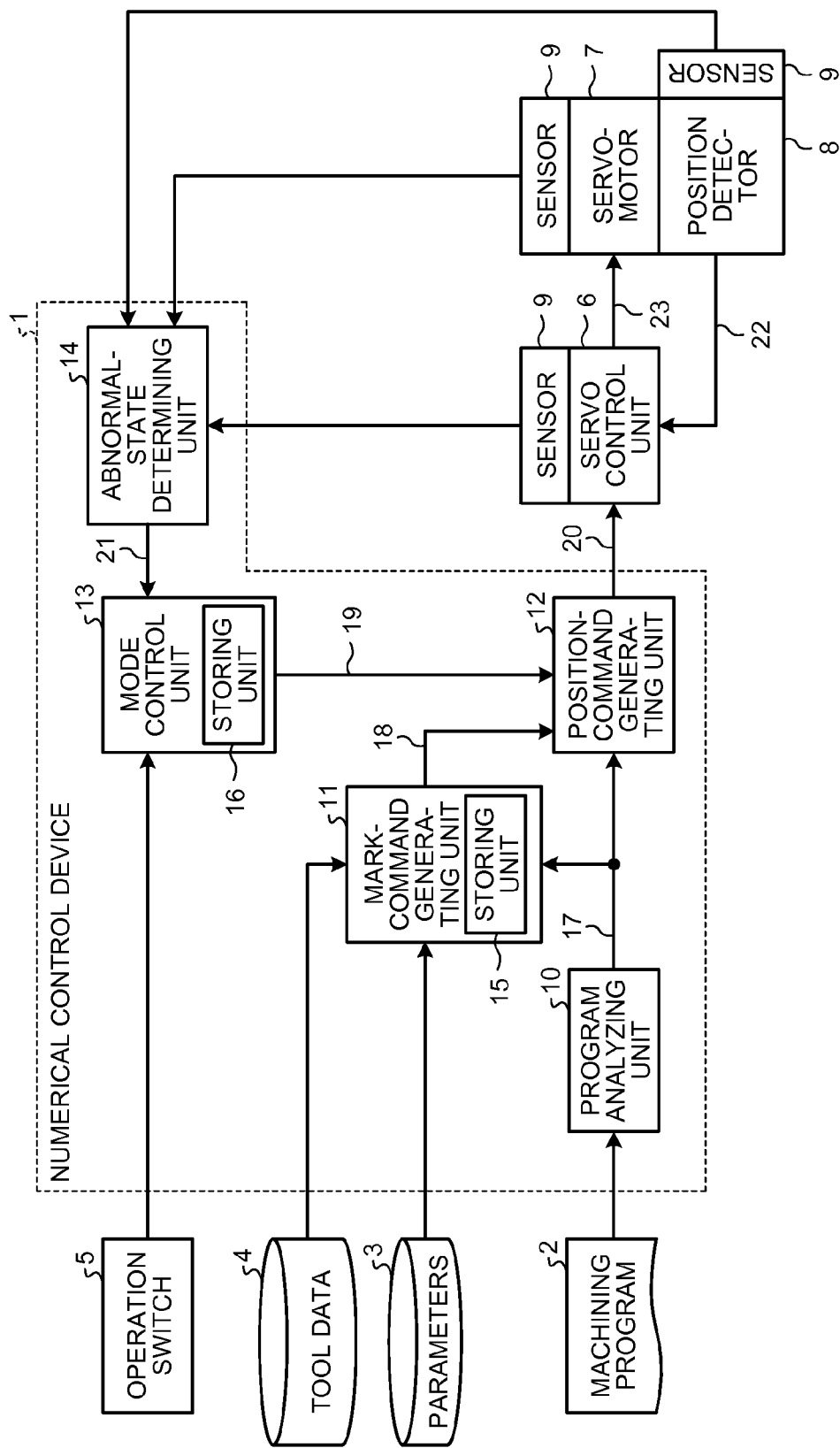
FIG. 2 is a block diagram of the overall configuration of the numerical control device and the configuration for driving of motors.

FIG. 2 is a block diagram of the overall configuration of the numerical control device and the configuration for driving of the motors. A numerical control device 1 outputs a position command 20 to a servo control unit 6 to cause the machine tool to perform an operation corresponding to a machining program 2.

The servo control unit 6 outputs a voltage command 23 to a servomotor 7 based on the position command 20 output from a position-command generating unit 12 and detected position information 22 output from a position detector 8. The position detector 8 detects the position of the servomotor 7 and outputs the detected position as the detected position information 22. The servo control unit 6 carries out feedback control and feed-forward control of the servomotor 7 such that the position indicated by the detected position information 22 follows a position commanded by the position command 20. The servomotor 7 performs driving according to the voltage command 23 output from the servo control unit 6.

Sensors 9 are respectively attached to the servo control unit 6, the servomotor 7, and the position detector 8. The sensors 9 detect a state of machining and output detection signals.

An operation switch 5 connected to the numerical control device 1 is a switch for operating the machine tool. The operation switch 5 includes various switches such as a cycle start button and an emergency stop switch. The cycle start button is a switch for causing the machine tool to start the operation described in the machining program 2. The emergency switch is a switch for forcibly stopping the operation of the machine tool.

The machining program 2 is, for example, an NC program or a motion program. The machining program 2 is a program described by combining command codes called G code, M code, and T code. Moving commands of the machining program 2 include a positioning command (G00), a cutting command (G01), and an arc command (G02/03). The moving commands also include a command (G54, etc.) for designating a coordinate and a command (G90/G91) for designating a coordinate value as an absolute value or a relative value. Note that addresses of X, Y, and Z following G1 are addresses for designating a coordinate of an end point of a block. Feed speed for moving the tool 102 from a start point position to an end point position of the block is designated by an F address.

Besides, M codes include a command for designating rotation (M3) and stop (M5) of a main shaft, and a command (M6) for replacement of the tool 102. By using, together with M6, a T code for selecting a tool number, it is possible to instruct replacement with the tool 102 selected by the tool number.

Parameters 3 are setting values for specifying the shape and the position of a mark. The mark indicates that an abnormality has occurred in machining and indicates that the work 100 is defective work. The parameters 3 include information concerning a machining shape of the mark and information concerning a machining position of the mark. The information concerning the machining shape is information concerning the type, the size, the line width, and the like of the mark. The information concerning the machining position is information concerning a position where the mark is machined. Tool data 4 is information concerning the tool 102 used for the machining. The tool data 4 includes, for example, data of a tool radius of the tool 102.

The numerical control device 1 includes a program analyzing unit 10, a mark-command generating unit 11, a position-command generating unit 12, a mode control unit 13, and an abnormal-state determining unit 14.

The program analyzing unit 10 analyzes the machining program 2 input to the numerical control device 1. The program analyzing unit 10 sequentially reads, line by line, commands described in the machining program 2 and outputs analysis data 17. The analysis data 17 includes, for example, information concerning movement such as a start point position, an end point position, and feed speed for each of blocks and information such as a number representing the tool 102 in use.

The position-command generating unit 12 generates the position command 20 to the motors based on the analysis data 17 output from the program analyzing unit 10. The mark-command generating unit 11 generates a mark command 18 based on the parameters 3 and the tool data 4. The mark command 18 is a command for machining of a mark indicating that an abnormality has occurred in machining. The mark-command generating unit 11 includes a storing unit 15. The storing unit 15 sequentially stores information concerning a moving route of the tool 102 by machining.

The abnormal-state determining unit 14 determines, based on detection signals from the sensors 9 attached to the servo control unit 6, the servomotor 7, and the position detector 8, whether an abnormality has occurred in the operation and the state of the machine tool. The abnormal-state determining unit 14 outputs a determination result of presence or absence of an abnormality as a state signal 21. The abnormal-state determining unit 14 instructs, upon detecting occurrence of an abnormality, a not-shown display unit and a not-shown sound generating unit to raise an alarm.

For example, a threshold for detection signals from the sensors 9 is set in the abnormal-state determining unit 14 in advance. The abnormal-state determining unit 14 determines presence or absence of an abnormality based on a result obtained by comparing the detection signals and the threshold. The sensors 9 for obtaining detection signals are not limited to be attached to the servo control unit 6, the servomotor 7, and the position detector 8. The sensors 9 can be attached to any components or positions as long as the sensors 9 can detect the operation and the state of the machine tool.

The numerical control device 1 selects, according to the determination in the abnormal-state determining unit 14 and the operation by the operation switch 5, any of continuation or stop of movement based on the analysis data 17, or movement based on the mark command 18 and reflects the selected content on the position command 20.

The mode control unit 13 controls selection of an operation mode to be reflected on the position command 20. The mode control unit 13 generates an operation mode switching signal 19 according to the operation of the operation switch 5 and the state signal 21 output from the abnormal-state determining unit 14. The operation mode switching signal 19 is a signal for switching an operation mode of the position-command generating unit 12. The mode control unit 13 outputs the operation mode switching signal 19 to the position-command generating unit 12. The mode control unit 13 includes a storing unit 16. The storing unit 16 stores an operation mode in the last processing cycle.

The position-command generating unit 12 switches, according to the operation mode switching signal 19 output from the mode control unit 13, the operation mode to be reflected on the position command 20. The position-command generating unit 12 can switch the operation mode to, for example, a normal machining mode, a movement stop mode, and a mark machining mode.

The normal machining mode is an operation mode for generating the position command 20 based on the analysis data 17 output from the program analyzing unit 10. In the normal machining mode, the position-command generating unit 12 outputs the position command 20 at every moment corresponding to the analysis data 17. The servomotor 7 performs driving for normal machining according to an input of the position command 20 to the servo control unit 6.

The movement stop mode is an operation mode continued from a point in time when an alarm is raised according to detection of an abnormality until the abnormality causing the alarm is eliminated. In the movement stop mode, the position-command generating unit 12 stops the output of the position command 20 to the servo control unit 6. When the input of the position command 20 to the servo control unit 6 is stopped, the servomotor 7 stops the driving. The tool 102 stops the movement.

The mark machining mode is an operation mode executed when the operation mode is switched from the movement stop mode to the normal machining mode. In the mark machining mode, the position-command generating unit 12 outputs the position command 20 at every moment corresponding to the mark command 18. The servomotor 7 performs driving for machining of a mark according to the input of the position command 20 to the servo control unit 6.

Figure 3:
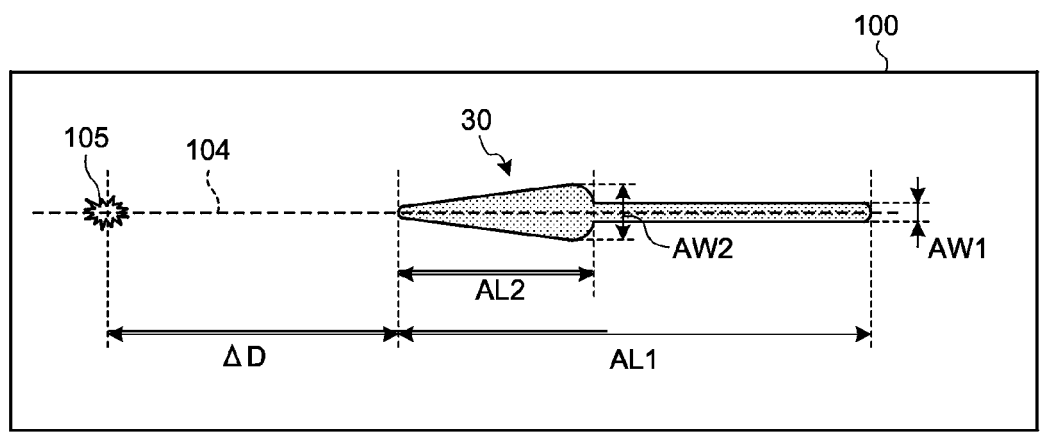
FIG. 3 is a diagram of a mark formed along a linear moving route.
Figure 4:
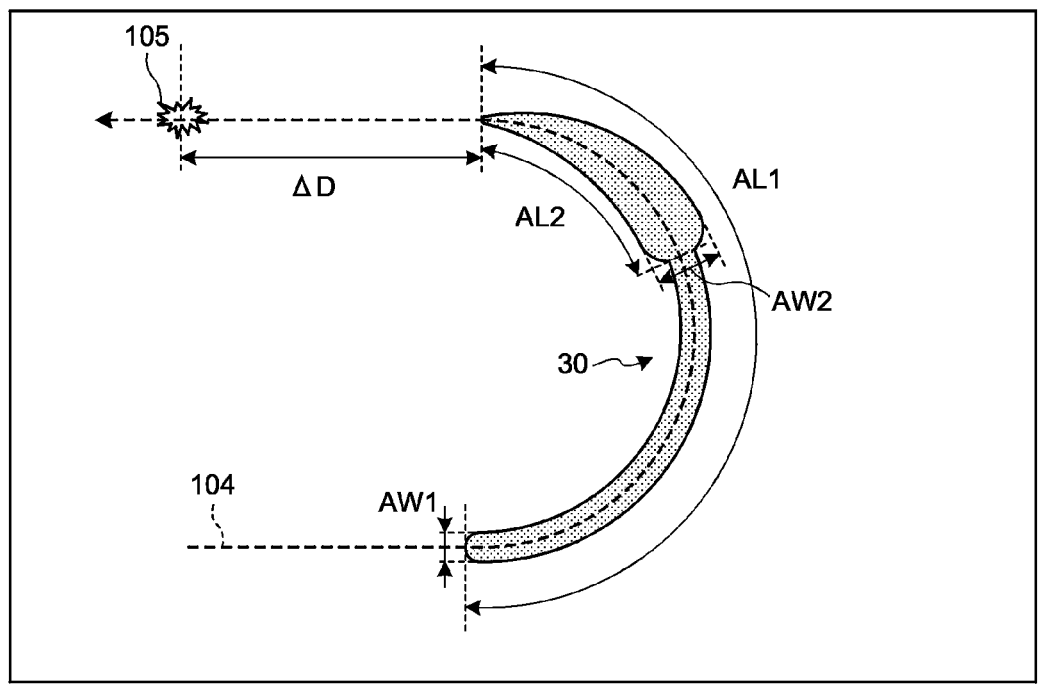
FIG. 4 is a diagram of a mark formed along an arcuate moving route.

FIGS. 3 and 4 are diagrams of examples of marks appended to work. In this embodiment, the shape of a mark 30 is an arrow shape extending along a moving route 104 of the tool 102 by machining. In FIG. 3, the mark 30 formed along the moving route 104 having a linear shape is shown. In FIG. 4, the mark 30 formed along the moving route 104 having an arcuate shape is shown.

In this embodiment, the mark 30 is machined with reference to a position traced back on the moving route 104 from a position 105 where an alarm is raised in a direction opposite to a direction during the machining. The parameters 3 include, as information concerning a machining shape, numerical values indicating entire length AL1 from a tip of an arrowhead portion of an arrow to an end of a shaft portion, length AL2 of the arrowhead portion, maximum width AW2 of the arrowhead portion, and line width AW1 of the shaft portion. Length means length in a direction extending along the moving route 104. Width means width in a direction perpendicular to the moving route 104. The parameters 3 include, as information concerning a machining position, a numerical value indicating a distance ΔD between the position 105 and the tip of the arrowhead.

In the case of the mark 30 shown in FIG. 3, the parameters 3 are set as, for example, AL1=8 mm, AL2=3 mm, AW1=0.5 mm, AW2=1.5 mm, and ΔD=5 mm.

ΔD is equivalent to a distance for moving the tool 102 from a point in time when an alarm is raised until machining of the mark 30 is started. In the parameters 3, a fixed distance ΔD is set concerning the movement of the tool 102 from the point in time when the alarm is raised until the machining of the mark 30 is started. According to such information concerning the machining position, the mark-command generating unit 11 generates the mark command 18 for moving the tool 102 to a position traced back from the position 105 in the opposite direction by a fixed distance.

Besides, the mark-command generating unit 11 can generate the mark command 18 for moving the tool 102 to a position traced back from the position 105 in the opposite direction by a distance equivalent to movement in a fixed time. In this case, in the parameters 3, a fixed time from the point in time when the alarm is raised until the machining of the mark 30 is started is set instead of the fixed distance ΔD.

The mark-command generating unit 11 can use both the fixed distance ΔD and the fixed time as the information concerning the machining position. Further, the mark-command generating unit 11 can select the fixed distance Δd or the fixed time and use the selected information as the information concerning the machining position. The mark-command generating unit 11 selects the fixed distance ΔD or the fixed time according to, for example, feed speed of the tool 102.

According to this embodiment, the numerical control device 1 can perform control for machining of the mark 30 not only when the moving route 104 by the machining program 2 is linear. The numerical control device 1 can also perform control for machining of the mark 30 according to various shapes of the moving route 104. The numerical control device 1 can generate the mark command 18 based on the same information concerning the machining shape and the same information concerning the machining position included in the parameters 3 in any case, for example, when the moving route 104 is arcuate as shown in FIG. 4 besides when the moving route 104 is linear.

When the same information concerning the machining shape and the same information concerning the machining position as the information shown in FIG. 3 are used, the mark 30 shown in FIG. 4 are also set as AL1=8 mm, AL2=3 mm, AW1=0.5 mm, AW2=1.5 mm, and ΔD=5 mm. In this way, irrespective of the shape of the moving route 104, the mark 30 having the same length along the moving route 104 and having the same width is always obtained. Irrespective of the shape of the moving route 104, the mark 30 is machined in a position traced back from the position 105 by the same distance along the moving route 104.

With the numerical control device 1 in this embodiment, the machine tool generates the mark 30 with the distal end of the arrowhead portion pointed at the position 105. The mark 30 is machined such that the position traced back from the position 105 on the moving route 104 by the predetermined distance is the tip of the arrowhead portion. Note that the shape of the mark 30 is not limited to the arrow shape. The mark 30 can be formed in any shape as long as the mark 30 can be easily visually recognized.

Figures 5, 6:
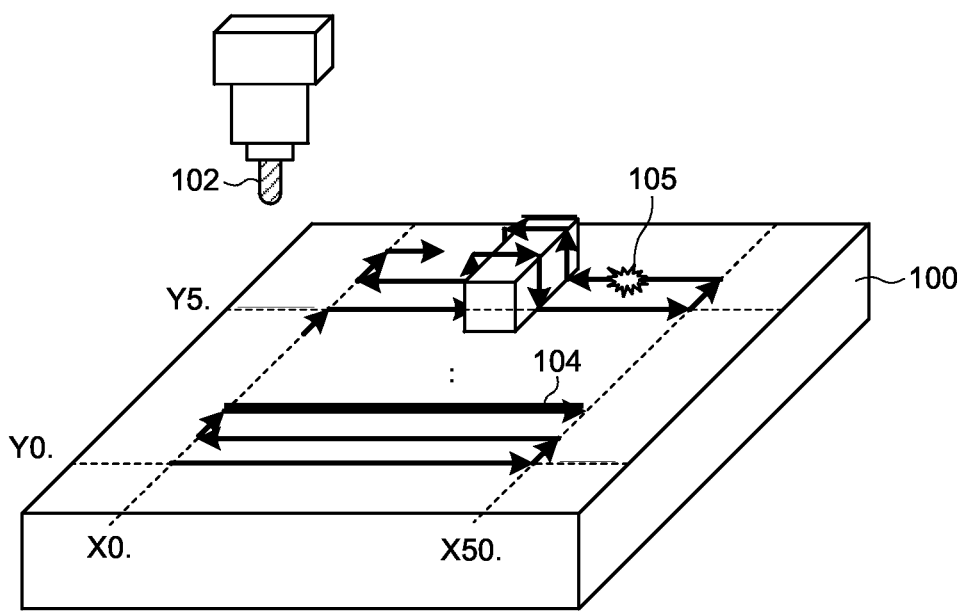
FIG. 5 is a diagram of an example of a machining program.
FIG. 6 is a diagram of an example of a moving route described in the machining program and a position where an alarm is raised.

The operation of the program analyzing unit 10 is explained. FIG. 5 is a diagram of an example of a machining program. The operation of the program analyzing unit 10 is explained with reference to an example of execution of the machining program shown in FIG. 5 in a state in which positioning to a co-ordinate basic origin is performed at a start point of the machining program 2.

First, the program analyzing unit 10 reads a command of an N1 block. The program analyzing unit 10 recognizes that the command is a command for performing movement at feed speed F3000 from the co-ordinate basic origin (a start point), which is the present position, to a position (an end point) of X0. Y0. Z0 in a coordinate system specified as G54. The program analyzing unit 10 outputs information such as a start point coordinate value, an end point coordinate value, feed speed, and an interpolation type as the analysis data 17 of the N1 block. The end point coordinate value of the N1 block is set as the origin (X0. Y0. Z0) of a work coordinate system.

Subsequently, the program analyzing unit 10 reads a command of an N2 block. The program analyzing unit 10 recognizes that the command is a command for performing movement at the speed F3000 from the origin (X0. Y0. Z0) of the work coordinate to a position of X50. Y0. Z0. The program analyzing unit 10 outputs information such as a start point coordinate value, an end point coordinate value, feed speed, and an interpolation type as the analysis data 17 of the N2 block. The program analyzing unit 10 performs the same processing concerning commands of an N3 block and subsequent blocks to output the analysis data 17 of each of the blocks.

Figure 7:
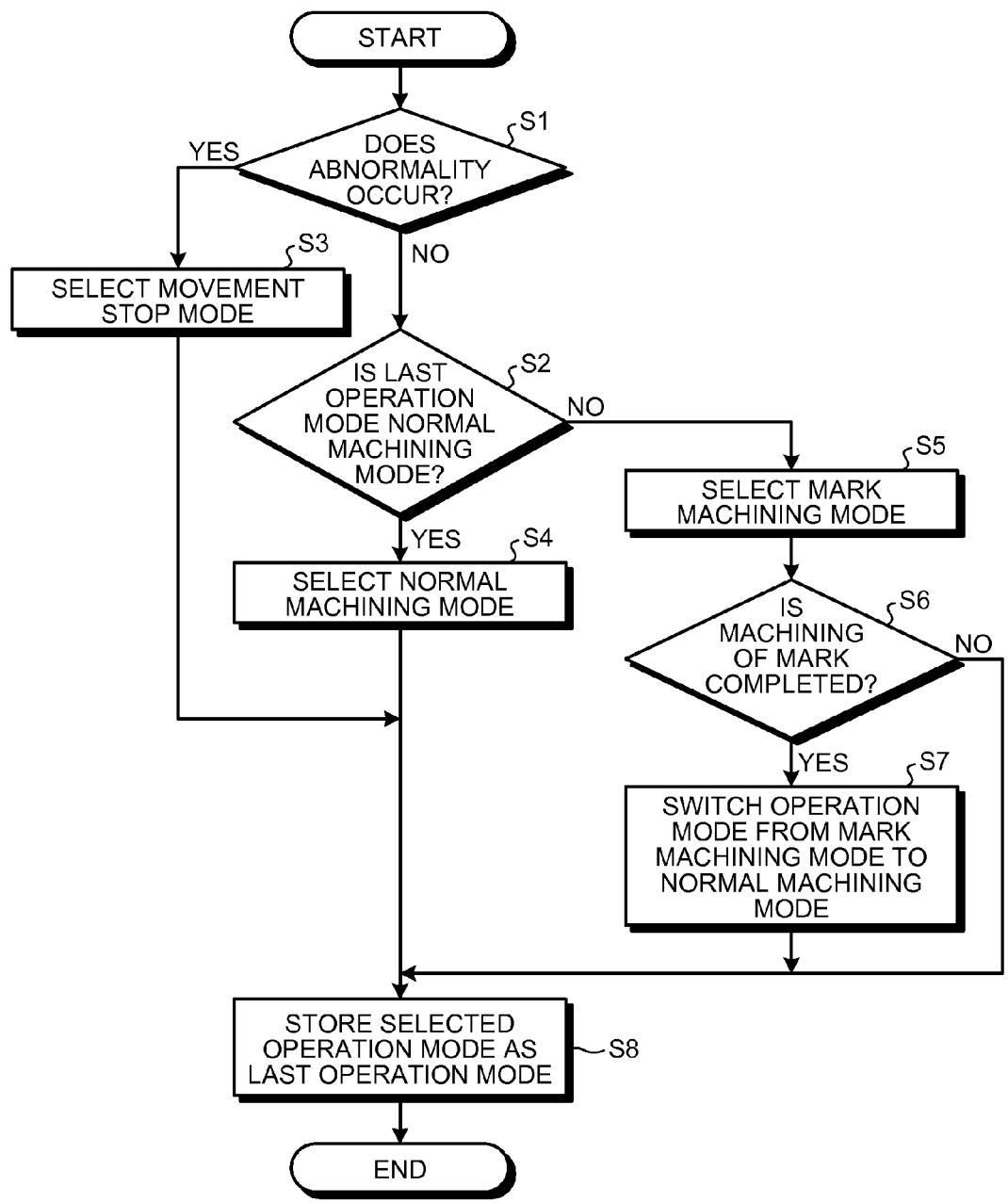
FIG. 7 is a flowchart for explaining an operation procedure of a mode control unit.

The operation of the mode control unit is explained. FIG. 7 is a flowchart for explaining an operation procedure of the mode control unit. The mode control unit 13 selects the normal machining mode as an operation mode at the time when a power supply for the machine tool is turned on. The mode control unit 13 carries out, for each of cycles for executing processing corresponding to the analysis data 17, the processing according to the procedure shown in FIG. 7.

At step S1, the mode control unit 13 determines presence or absence of occurrence of an abnormality from the state signal 21 input from the abnormal-state determining unit 14.

When determining that an abnormality has not occurred (No at step S1), the mode control unit 13 reads out the last operation mode recorded in the storing unit 16. The last operation mode is an operation mode selected at a processing cycle of the last time. At step S2, the mode control unit 13 determines whether the last operation mode is the normal machining mode.

When determining that the last operation mode is the normal machining mode (Yes at step S2), at step S4, the mode control unit 13 selects the normal machining mode. The mode control unit 13 causes the storing unit 16 to store the normal machining mode, which is the operation mode selected at step S4, as the last operation mode (step S8).

The procedure through steps S2 and S4 is processing performed when normal machining is performed. While the mode control unit 13 is selecting the normal machining mode, the position-command generating unit 12 outputs the position command 20 corresponding to the analysis data 17.

On the other hand, when determining that an abnormality occurs at step S1 (Yes at step S1), the mode control unit 13 selects the movement stop mode at step S3. The mode control unit 13 causes the storing unit 16 to store the movement stop mode, which is the operation mode selected at step S3, as the last operation mode (step S8).

The procedure through step S3 is performed when an abnormality is detected. Consequently, the mode control unit 13 switches the selection of the operation mode from the normal machining mode to the movement stop mode. The mode control unit 13 outputs the operation mode switching signal 19 for switching from the normal machining mode to the movement stop mode.

The mode control unit 13 continues the movement stop mode until the mode control unit 13 determines at step S1 that an abnormality has not occurred, i.e., the abnormality causing the selection of the movement stop mode is eliminated. While the mode control unit 13 is selecting the movement stop mode, the position-command generating unit 12 stops the output of the position command 20 to the servo control unit 6.

When determining at step S2 that the last operation mode is not the normal machining mode (No at step S2), the mode control unit 13 selects the mark machining mode at step S5. When the selection of the operation mode is switching from the movement stop mode to the mark machining mode, the mode control unit 13 outputs the operation mode switching signal 19 for switching from the movement stop mode to the mark machining mode.

The mode control unit 13 determines whether the machining of the mark 30 is completed. When determining that the machining of the mark 30 is not completed (No at step S6), the mode control unit 13 causes the storing unit 16 to store the mark machining mode, which is the operation mode selected at step S5, as the last operation mode (step S8).

When determining that the machining of the mark 30 is completed (Yes at step S6), the mode control unit 13 switches the selection of the operation mode from the mark machining mode to the normal machining mode (step S7). The mode control unit 13 outputs the operation mode switching signal 19 for switching from the mark machining mode to the normal machining mode. The mode control unit 13 causes the storing unit 16 to store the normal machining mode, which is the operation mode after the switching at step S7, as the last operation mode (step S8).

The procedure through steps S2, S5, and S6 is performed when the state signal 21 indicating normality is input and when the last operation mode is the operation mode other than the normal machining mode. Such processing is performed when the mark 30 is machined prior to resumption of the normal machining after the abnormality is eliminated. Further, the procedure through steps S6 and S7 is processing performed when the machining of the mark 30 is completed and the normal machining is resumed. When the last operation mode is stored in the storing unit 16 at step S8 after any one of the operation modes is selected, the mode control unit 13 ends the processing in the present processing cycle.

The machining of the mark 30 due to the raising of an alarm during the execution of the machining program 2 is explained in detail. FIG. 6 is a diagram of an example of a moving route described in the machining program and a position where an alarm is raised.

The numerical control device 1 performs control by the normal operation mode from a point in time when machining corresponding to the machining program 2 is started until an alarm is raised. In the normal machining mode, the numerical control device 1 repeats the operation from the analysis of a command for each of the blocks to the output of the position command 20. The storing unit 15 sequentially stores data of the moving route 104 according to the analysis data 17.

The storing unit 15 only has to store, with a start point set in the latest position indicated by the position command 20, at least the moving route 104 equivalent to a distance set as information concerning a machining position in the parameters 3. The storing unit 15 sequentially stores data of the moving route 104 such that a sum of moving distances of the tool 102 in the blocks is larger than the distance set in the parameter 3, for example, ΔD. In the normal machining mode, the storing unit 15 continues update of the data of the moving route 104 until an alarm is raised in the normal machining mode.

When an alarm is raised, the mode control unit 13 generates the operation mode switching signal 19 for switching the operation mode from the normal machining mode to the movement stop mode. Upon receiving the operation mode switching signal 19 from the mode control unit 13, the position-command generating unit 12 stops the output of the position command 20. The storing unit 15 stops the update of the data of the moving route 104. The mode control unit 13 maintains the movement stop mode until an abnormality causing the alarm is eliminated.

When the abnormality is eliminated, the mode control unit 13 generates the operation mode switching signal 19 for switching the operation mode from the movement stop mode to the mark machining mode. Upon receiving the operation mode switching signal 19 from the mode control unit 13, the position-command generating unit 12 generates the position command 20 corresponding to the mark command 18 from the mark-command generating unit 11.

As a specific example, the machining of the mark 30 performed when an alarm is raised halfway in a block N57 of the machining program 2 shown in FIG. 5 is explained. The numerical control device 1 carries out control for machining the mark 30 in a position traced back on the moving route 104 by the predetermined distance ΔD from the position where the alarm is raised. In the following explanation, the mark 30 shown in FIG. 3 is machined.

For example, it is assumed that, in the moving route 104 shown in FIG. 6, an alarm is raised in the position 105 of X35. Y5.1. Z0. The storing unit 15 has stored therein the moving route 104 of a distance longer than a sum (ΔD+AL1) of the distance ΔD from the position 105 and the entire length AL1 of the mark 30. When ΔD is 5 millimeters and AL1 is 8 millimeters, the storing unit 15 has stored therein the moving route 104 to a position traced back from the position 105 by at least 13 millimeters.

When the mode control unit 13 selects the mark machining mode, the mark-command generating unit 11 generates a movement command for moving the tool 102 on the moving route 104 by ΔD in a direction opposite to a direction during the machining. The movement command is a movement command for commanding movement from the position 105 to the position at the tip of the arrowhead portion of the mark 30. In this example, the direction opposite to the direction during the machining is the plus X direction. The position at the tip of the arrowhead portion is the position of X40. Y5.1. Z0.

Further, the mark-command generating unit 11 shifts the position of the tool 102 in the tool axis direction with respect to the position during the machining by applying, to the movement command, correction for separating the tool 102 from the work 100. In this example, the tool axis direction is the Z-axis direction.

Consequently, the mark-command generating unit 11 generates, as the mark command 18, a movement command for moving the tool 102 on the moving route 104 in the direction opposite to the direction during the machining while shifting the position of the tool 102 in the tool axis direction with respect to the position during the machining. The position-command generating unit 12 generates the position command 20 based on the mark command 18.

The position command 20 generated based on the mark command 18 is input to the servo control unit 6. Then, the tool 102 moves on the moving route 104 from the position 105 in the plus X direction by ΔD in a state in which the tool 102 is separated from the surface of the work 100 in the Z-axis direction. Consequently, the tool 102 moves without shaving the surface of the work 100. The machine tool can avoid movement of the tool 102 in a state in which the tool 102 rubs against the work 100.

Note that, in the process for moving the tool 102 from the position 105 by ΔD, the mark-command generating unit 11 can omit the correction of the position of the tool 102 in the tool axis direction. In this case, the tool 102 moves while tracing a machined portion in the work 100. In this case, the machine tool can also move the tool 102 without shaving the surface of the work 100 anew.

Subsequently, the mark-command generating unit 11 generates the mark command 18 for machining of the mark 30. In this example, the mark-command generating unit 11 generates the mark command 18 for machining the mark 30 in which the position of X40.Y5.1. Z0 is the tip of the arrowhead portion and the position of X48. Y5.1. Z0 is the end of the shaft portion.

First, the mark-command generating unit 11 generates, as the mark command 18, a moving command for moving the tool 102 along the moving route 104 from the tip of the arrowhead portion to the end of the shaft portion while correcting the position of the tool 102 in the tool axis direction. The mark-command generating unit 11 adjusts a shift amount of the tool 102 in the tool axis direction using the tool radius of the tool 102 and the line width AW1 of the shaft portion.

Figure 8:
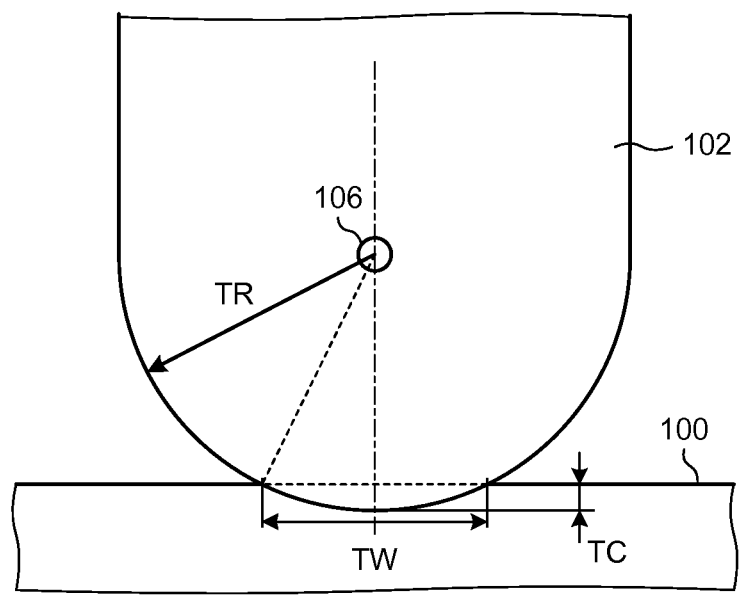
FIG. 8 is a diagram for explaining a calculation of a shift amount.

FIG. 8 is a diagram for explaining a calculation of a shift amount. A shift amount TC is set such that width TW of a region cut when the tool 102 moves in a state of contact with the work 100 coincides with a desired line width AW1 of the shaft portion. For example, when the line width AW1 of the shaft portion is 0.5 millimeters, the tool 102 is shifted in the tool axis direction to shave off a region with TW=0.5 mm. Note that the shift amount TC is length from the surface of the work 100 to a deepest reaching point of the tool 102 in the tool axis direction.

The mark-command generating unit 11 acquires data of a tool radius TR of the tool 102 currently in use by referring to the tool data 4. The tool radius TR is length from the tip of the tool 102 to a tool center 106. TC is represented by the following Formula (I):

$$TC=TR-\{TR^2-(TW/2)^2\}^{1/2} \qquad (1)$$

For example, when a ball end mill with TR=5 mm is used as the tool 102, when TW=0.5 mm is set, TC is calculated as about 0.0063 millimeters from Formula (I).

The mark-command generating unit 11 generates the mark command 18 corrected by TC. The mark-command generating unit 11 inputs the position command 20 generated based on the mark command 18 to the servo control unit 6. Then, the tool 102 cuts a region with the line width AW1 from the tip of the arrowhead portion to the end of the shaft portion.

Subsequently, the mark-command generating unit 11 generates the mark command 18 for machining of the arrowhead portion. The mark-command generating unit 11 generates, as the mark command 18, a moving command for moving the tool 102 along the moving route 104 and gradually changing the shift amount TC. The shift amount TC is changed according to the shape of the arrowhead portion between the tip of the arrowhead portion and a position of the arrowhead portion in the base connected to the shaft portion.

The arrowhead portion has maximum width AW2 in the position of the base. The shift amount TC is adjusted such that the width TW of the region cut when the tool 102 moves in a state of contact with the work 100 gradually increases from Aw1 to AW2 from the tip of the arrowhead portion to the base. For example, when AW2 is 1.5 millimeters, TC at TW=AW2=1.5 mm is calculated as about 0.0566 millimeters according to Formula (I).

The mark-command generating unit 11 generates the mark command 18 for changing TC from 0.0063 millimeters to about 0.0566 mm such that TW gradually changes from AW1=0.5 mm to AW2=1.5 mm. The position command 20 generated based on the mark command 18 is input to the servo control unit 6. Then, the tool 102 cuts a region having the shape of the arrowhead portion.

Note that, concerning the mark command 18 generated by the mark-command generating unit 11, for example, the order of the machining of the mark 30 and a method of correcting the position of the tool 102 in the tool axis direction are not specifically limited and can be arbitrarily set.

According to this embodiment, the numerical control device 1 machines the mark 30 in a position traced back on the sequentially stored moving route 104 to enable easy sorting of defective work. Even when the normally machined work 100 and the defective work 100 are mixed, it is possible to easily sort the defective work at a glance by checking the mark 30.

The numerical control device 1 can machine the mark 30 irrespective of the shape of the work 100 and a progress stage of the machining even if the complicated machining program 2 is not prepared.

Consequently, there is an effect that the numerical control device 1 makes it possible to machine, with the simple machining program 2, the mark 30 for identifying the work 100, during machining of which an abnormality occurs, and easily sort defective work caused by the occurrence of the abnormality.

The numerical control device 1 sets, as the position of the mark 30, a position traced back on the moving route 104 by a predetermined distance from the position 105 where an alarm is raised. The numerical control device 1 sets the position of the mark 30 in a position other than a machining position at the time when an abnormality occurs. Depending on setting of an interval from the position 105 to the mark 30, the position of the mark 30 can be set in a position close to the machining position at the time when the abnormality occurs.

Consequently, a user or a maintenance staff member can specify, from the position of the mark 30, the position at the time when the abnormality occurs. The user or the maintenance staff member can easily check a degree of scratches due to the abnormality using the mark 30 as a clue.

The numerical control device 1 adjusts a shift amount in the tool axis direction according to the tool radius and the line width of the mark 30 to enable control for obtaining the mark 30 having desired line width. Consequently, the mark 30 that is easily visually recognized by vision is obtained. It is possible to easily sort defective work.

Second Embodiment

The numerical control device 1 according to a second embodiment is included in a machine tool, which is a lathe. The machine tool has a C axis, which is a rotation axis (a turning axis) for rotating work, and at least an X axis and a Y axis, which are axes of movement for moving a turning tool. The machine tool carries out, for work having a cylindrical shape, outer diameter turning for an outer diameter portion and end face turning for an end face portion.

The numerical control device 1 according to the second embodiment has a configuration same as the configuration of the numerical control device 1 according to the first embodiment. In the first and second embodiments, the mark-command generating unit 11 carries out different kinds of processing.

Figure 9:
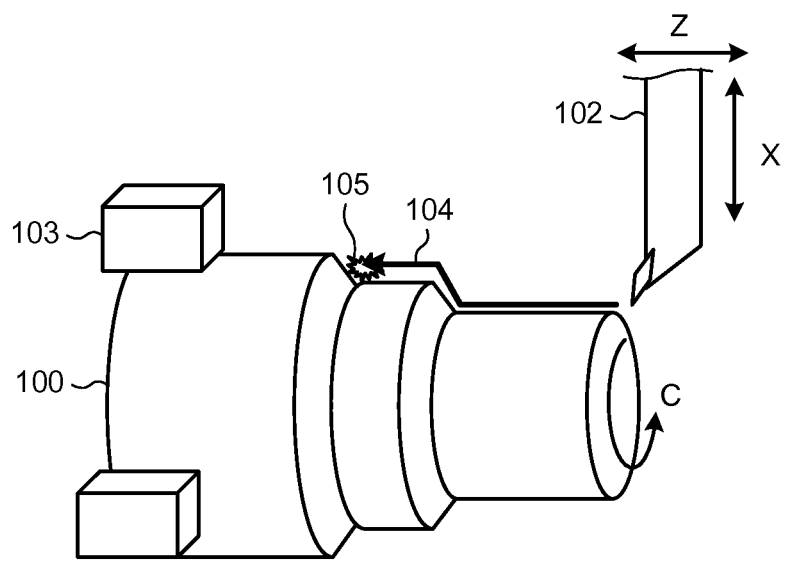
FIG. 9 is a diagram of a state in which outer diameter turning is applied to work.

FIG. 9 is a diagram of a state in which the outer diameter turning is applied to the work. The machine tool rotates the work 100 around the C axis. The tool 102 is a turning tool movable in the X-axis direction and the Z-axis direction. A chuck 103 is a tool for fixing the work 100 to the machine tool. In FIG. 9, the moving route 104 in turning the external shape of the work 100 and the position 105 at the time when an alarm is raised are shown.

The storing unit 15 of the mark-command generating unit 11 stores, as the moving route 104 equivalent to a predetermined distance immediately before the raising of the alarm, amounts of movement of the tool 102 in the X-axis direction and the Z-axis direction and an amount of movement of the work 100 around the C axis.

In this embodiment, a rough surface 107 is formed on the surface of the work 100 as a mark indicating that an abnormality has occurred in turning. The mark-command generating unit 11 generates the mark command 18 for obtaining the rough surface 107 in a mark formation mode.

Figure 10:
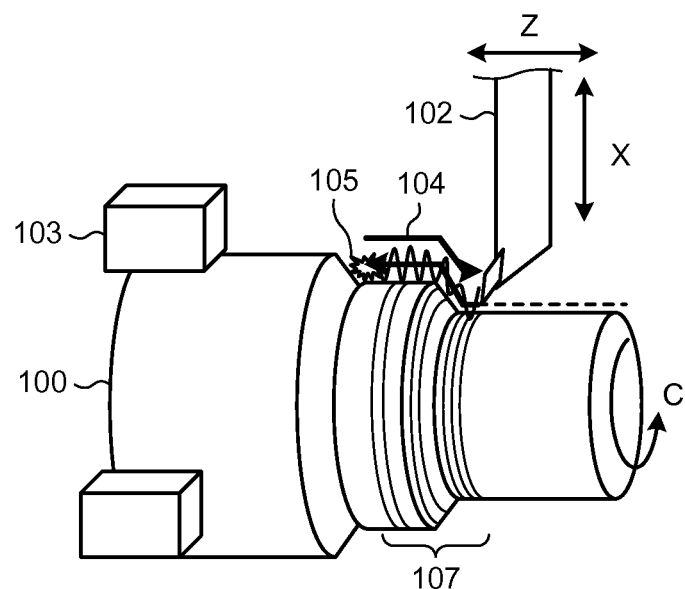
FIG. 10 is a diagram of a state in which a rough surface is machined in an outer diameter portion of the work.

FIG. 10 is a diagram of a state in which the rough surface is machined in an outer diameter portion of the work. In the mark formation mode, the mark-command generating unit 11 generates, as the mark command 18, a moving command for moving the tool 102 on the moving route 104 in a direction opposite to a direction during the machining while correcting the position of the tool 102 in the tool axis direction with respect to the position during the machining. The mark-command generating unit 11 adjusts the position of the tool 102 in the X-axis direction, which is the tool axis direction, to repeat an operation for bringing the tool 102 into contact with the work 100 and an operation for separating the tool 102 from the work 100.

The mark-command generating unit 11 inputs the position command 20 generated based on the mark command 18 to the servo control unit 6. Then, the tool 102 machines the rough surface 107 on the surface of the work 100. The rough surface 107 markedly deteriorates the quality of a machined surface. The mark-command generating unit 11 changes a shift amount, for example, at an arbitrary cycle from the start to the end of the movement of the tool 102 on the moving route 104. Alternatively, the mark-command generating unit 11 can gradually change the shift amount from the start to the end of the movement of the tool 102 on the moving route 104. The mark-command generating unit 11 can change the shift amount in any way as long as the rough surface 107 having markedly deteriorated quality is obtained.

Figure 11:
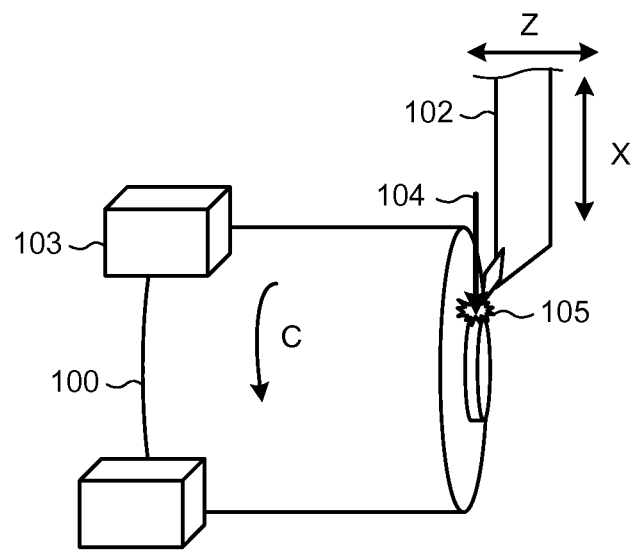
FIG. 11 is a diagram of a state in which end face turning is applied to the work.

FIG. 11 is a diagram of a state in which the end face turning is applied to the work. In FIG. 11, the moving route 104 in subjecting the work 100 to the end face turning and the position 105 at the time when an alarm is raised are shown. The storing unit 15 of the mark-command generating unit 11 stores, as the moving route 104 equivalent to a predetermined distance immediately before the raising of the alarm, amounts of movement of the tool 102 in the X-axis direction and the Z-axis direction and an amount of movement of the work 100 around the C axis.

Figure 12:
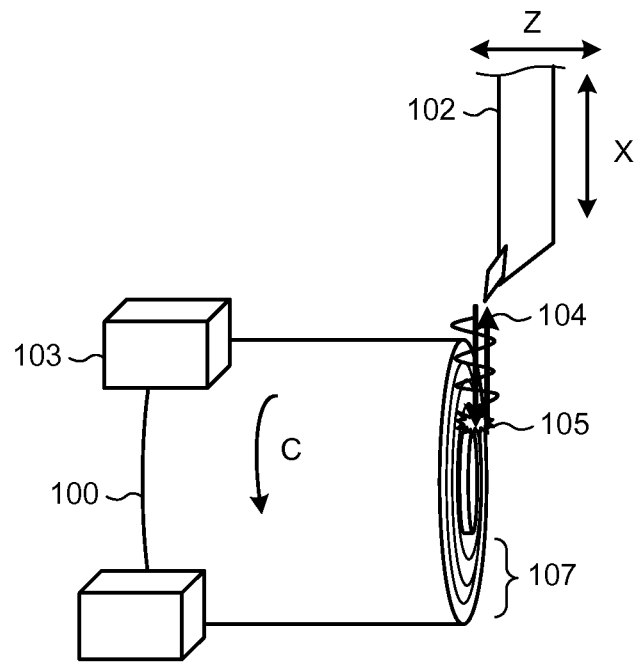
FIG. 12 is a diagram of a state in which a rough surface is machined in an end face portion of the work.

FIG. 12 is a diagram of a state in which the rough surface is machined in an end face portion of the work. When an alarm is raised in the machining of the end face portion of the work 100, the mark-command generating unit 11 also generates, as the mark command 18, a moving command for moving the tool 102 on the moving route 104 in a direction opposite to a direction during the machining while correcting the position of the tool 102 in the tool axis direction with respect to the position during the machining.

The mark-command generating unit 11 adjusts the position of the tool 102 in the Z-axis direction, which is the tool axis direction, to repeat an operation for bringing the tool 102 into contact with the work 100 and an operation for separating the tool 102 from the work 100.

The position command 20 generated based on the mark command 18 is input to the servo control unit 6. Then, the tool 102 machines the rough surface 107 on the surface of the work 100. The mark-command generating unit 11 changes a shift amount, for example, at an arbitrary cycle from the start to the end of the movement of the tool 102 on the moving route 104. Alternatively, the mark-command generating unit 11 can gradually change the shift amount from the start to the end of the movement of the tool 102 on the moving route 104. The mark-command generating unit 11 can change the shift amount in any way as long as the rough surface 107 having markedly deteriorated quality is obtained.

According to this embodiment, the numerical control device 1 machines, after an alarm is raised, the rough surface 107 having the markedly deteriorated quality of the machined surface to make it possible to sort defective work at a glance.

There is an effect that the numerical control device 1 makes it possible to machine, with the simple machining program 2, the mark 30 identifying the work 100, during machining of which an abnormality occurs, and easily sort defective work caused by the occurrence of the abnormality.

Third Embodiment

The numerical control device 1 according to a third embodiment is included in a machine tool, which is a lathe. The machine tool has a C axis, which is a rotation axis (a turning axis) for rotating work, and at least an X axis and a Y axis, which are axes of movement for moving a turning tool.

This embodiment is applied when it is difficult to visually recognize, from the appearance of the work 100, a position traced back on the moving route 104 immediately before raising of an alarm. This embodiment is suitable when an abnormality occurs in machining of the inner side of the work 100 such as inner diameter turning performed using a boring bar tool and tapping performed using a tap tool. For example, the numerical control device 1 in this embodiment carries out, for the work 100 having a cylindrical shape, control for the inner diameter turning of an inner diameter portion.

The numerical control device 1 according to the third embodiment has a configuration same as the configuration of the numerical control device 1 according to the first embodiment. In the first and third embodiments, processing by the mark-command generating unit 11 is different.

Figure 13:
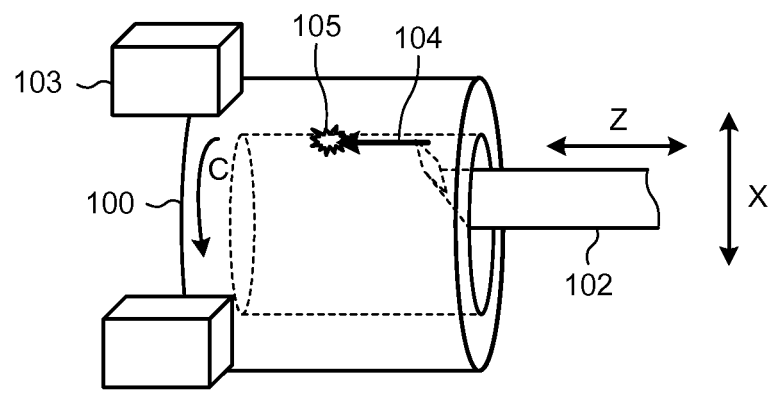
FIG. 13 is a diagram of a state in which inner diameter turning is applied to the work.

FIG. 13 is a diagram of a state in which the inner diameter turning is applied to the work. The machine tool rotates the work 100 around the C axis. The tool 102 is a turning tool movable in the X-axis direction and the Z-axis direction. The chuck 103 is a tool for fixing the work 100 to the machine tool. In FIG. 13, the moving route 104 in subjecting the work 100 to the inner diameter turning and the position 105 at the time when an alarm is raised are shown.

In the normal machining mode, the mark-command generating unit 11 in this embodiment performs an operation different from the operation of the mark-command generating unit 11 in the first and second embodiments. The mark-command generating unit 11 stops the storage of the moving route 104 in the storing unit 15 while the tool 102 for the inner diameter turning is selected.

While the inner diameter turning by the tool 102 is carried out, the storing unit 15 retains the latest moving route 104 before the start of the inner diameter turning. When an alarm is raised, the mark-command generating unit 11 generates the mark command 18 based on the latest moving route 104 stored by the storing unit 15 in the past. In the mark formation mode, the mark-command generating unit 11 generates, as the mark command 18, a moving command for moving the tool 102 on the moving route 104 in a direction opposite to a direction during the machining while shifting the position of the tool 102 in the tool axis direction with respect to the position during the machining.

The moving route 104 used for the generation of the mark command 18 is a moving route at the time when the tool 102 different from the currently selected tool 102 is selected. In the mark formation mode, the tool 102 selected on the moving route 104 retained by the storing unit 15 is returned and used for machining of a mark.

For example, when the moving route 104 retained by the storing unit 15 is a moving route by the outer diameter turning, the mark-command generating unit 11 generates the mark command 18 for machining the rough surface 107, which is a mark. The tool 102 selected in the outer diameter turning is used for the machining of the mark.

The mark-command generating unit 11 stores in advance setting concerning the tool 102 set as a target for which the storage of the moving route 104 is stopped. As the tool 102 set as a target for which the storage of the moving route 104 is stopped, a boring bar tool, a tap tool, or the like used in the machining of the inside of the work 100 is set.

According to this embodiment, even when an abnormality occurs in machining of the inner side that is hard to be visually recognized in the appearance in the work 100, the numerical control device 1 can machine a mark in an easily visible position based on the moving route 104 except at the time of selection of a specific tool 102. There is an effect that the numerical control device 1 makes it possible to machine, with the simple machining program 2, the mark identifying the work 100, during machining of which an abnormality occurs, and easily sort defective work caused by the occurrence of the abnormality.

REFERENCE SIGNS LIST

1 Numerical control device
2 Machining program
3 Parameters
4 Tool data
5 Operation switch
6 Servo control unit
7 Servomotor
8 Position detector
9 Sensor
10 Program analyzing unit
11 Mark-command generating unit
12 Position-command generating unit
13 Mode control unit
14 Abnormal-state determining unit
15 Storing unit
16 Storing unit
17 Analysis data
18 Mark command
19 Operation mode switching signal
20 Position command
21 State signal
22 Detected position information
23 Voltage command
30 Mark
100 Work
101 Stage
102 Tool
103 Chuck
104 Moving route
105 Position
106 Tool center
107 Rough surface

The invention claimed is:

1. A numerical control device that controls, in a machine tool including a motor for moving a tool for machining of work, driving of the motor based on a machining program, the numerical control device comprising:
   a position-command generating unit configured to generate a position command to the motor; and
   a mark-command generating unit configured to generate a mark command for machining of a mark indicating that an abnormality occurs in the machining, wherein
   the mark-command generating unit sequentially stores information concerning a moving route of the tool by the machining and generates, when an alarm is raised because the abnormality is detected, as the mark command, a moving command for moving the tool in a direction opposite to a direction during the machining while correcting a position of the tool in a tool axis direction with respect to a position during the machining, and
   the position-command generating unit generates the position command based on the mark command.

2. The numerical control device according to claim 1, wherein the mark-command generating unit generates the mark command for moving the tool to a position traced back by a fixed distance or a distance equivalent to movement in a fixed time in the opposite direction from a position at a point in time when the alarm is raised.

3. The numerical control device according to claim 1, wherein the mark-command generating unit adjusts a shift amount in the tool axis direction of the tool based on a tool radius of the tool selected during the machining and line width in a direction perpendicular to a direction of the moving route in the mark.

4. The numerical control device according to claim 1, wherein the mark-command generating unit stops the storage of the information concerning the moving route while the tool used in machining of an inner side of the work is selected and generates, when the alarm is raised, the mark command based on the moving route stored in the past.

5. The numerical control device according to claim 1, further comprising a mode control unit configured to control selection of an operation mode reflected on the position command, wherein
   the operation mode includes:
   a normal machining mode for machining corresponding to analysis data by an analysis of the machining program;
   a movement stop mode for stopping the movement of the tool from a point in time when the alarm is raised until the abnormality causing the raising of the alarm is eliminated; and
   a mark machining mode executed when the operation mode is switched from the movement stop mode to the normal machining mode and for causing the motor to perform driving for the machining of the mark.

* * * * *